March 24, 1936.    M. W. McARDLE ET AL    2,034,951
ICE CRUSHER AND METHOD OF MAKING SAME
Filed July 9, 1934
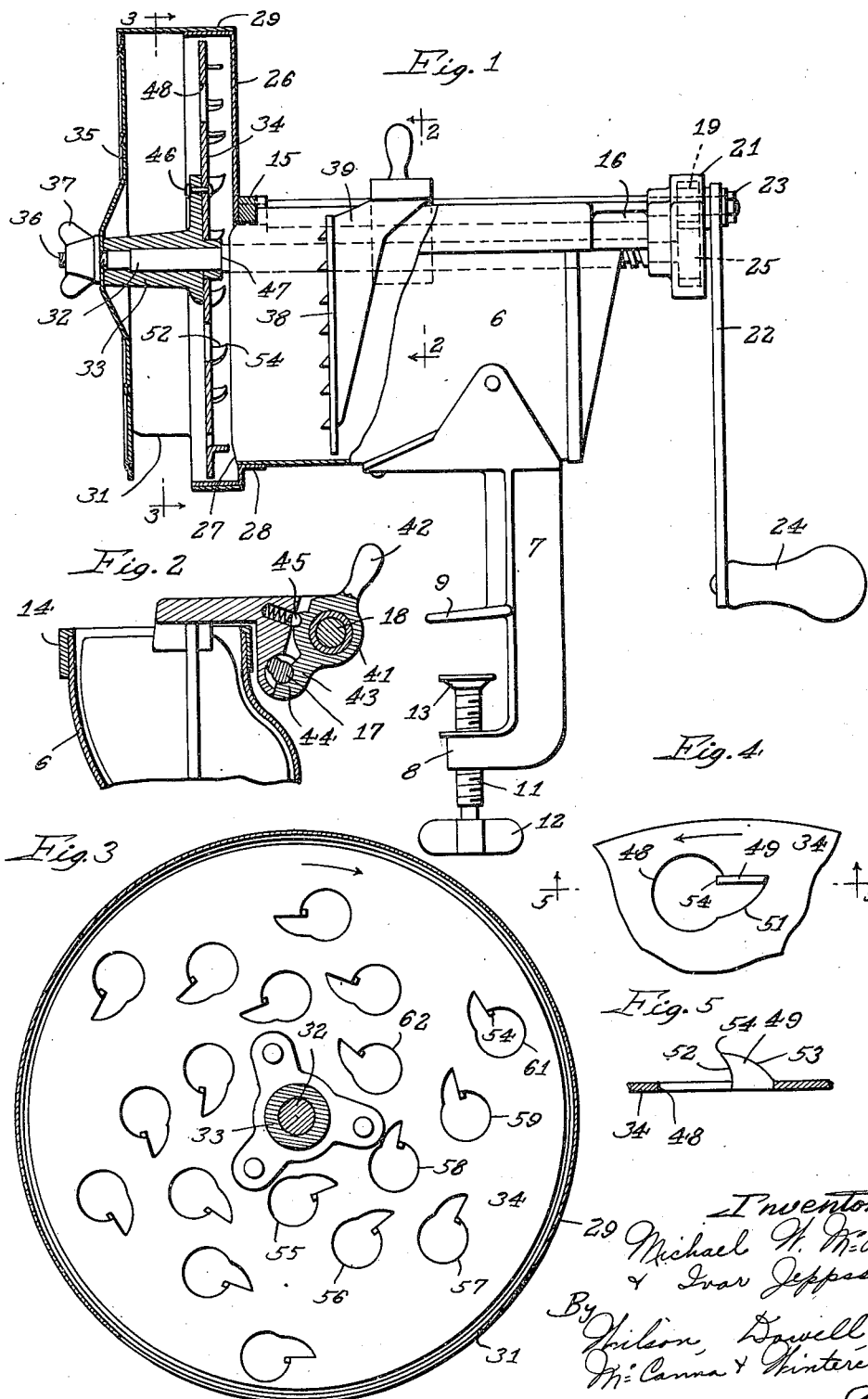

Patented Mar. 24, 1936

2,034,951

UNITED STATES PATENT OFFICE 2,034,951

ICE CRUSHER AND METHOD OF MAKING SAME

Michael W. McArdle and Ivar Jeppsson, Chicago, Ill., assignors to Chicago Flexible Shaft Company, Chicago, Ill., a corporation of Illinois Application July 9, 1934, Serial No. 734,242

5 Claims. (Cl. 83—62)

This invention relates to ice crushers, and has particular reference to a crusher wherein the ice is forced against a moving cutter plate to crush and cut the ice into relatively small pieces or chips.

An object of the invention is to provide a crusher wherein a cutter plate having a plurality of cutters is driven to cause the cutters to progressively remove small portions of the ice, and wherein feeding means serve to urge the ice into the cutter.

Another object of the invention is the provision of an ice crusher wherein a cutter plate has a plurality of openings and cutters trailing the openings positioned to cut the ice for passage through the openings.

Another object of the invention is to provide an ice crusher having a plate provided with circumferentially spaced groups of cutters, the cutters of each group being spirally spaced, and each group being offset with respect to the others whereby each of the cutters follows a different path, the plate having openings so positioned with respect to the cutters that the crushed ice passes through the openings.

Another object is to provide a crusher having a cutter plate of steel provided with punched openings and integral cutters sheared from the metal of the plate and bent out of the plane of the plate, the openings and the cutters being so positioned that the cutters direct the crushed ice into the openings.

We have also aimed to provide a crusher including a cutter plate having teeth provided with concave forward edges and convex trailing edges, the teeth being distributed on the face of the plate tangential to a plurality of concentric circles of different radius.

Other objects of the invention will be apparent from the following description and the accompanying drawing, in which—

Figure 1 is a side elevation, partly in section, showing an ice crusher embodying our invention;

Fig. 2 is a fragmentary section on the line 2—2 of Figure 1;

Fig. 3 is a section on the line 3—3 of Figure 1 showing the back of the cutter plate;

Fig. 4 is a fragmentary face view of the cutter plate showing one of the cutter teeth and one of the openings in the cutter plate, and Fig. 5 is a section on the line 5—5 of Fig. 4.

It will be understood that the device may take numerous different embodiments, but I have herein shown for purposes of illustration a mechanism wherein the numeral 6 designates a hopper within which the ice to be crushed is positioned. A vertical supporting member or table clamp designated generally by the numeral 7 is secured to the hopper and has the usual spaced fingers 8 and 9, the finger 8 carrying a screw 11 having a wing nut 12 and a foot 13. The device illustrated is designed for attachment to a table in the usual manner by clamping on the edge of the table. A frame 14 surrounds the open top of the hopper 6 and serves to reinforce the hopper and carry the driving mechanism for this purpose. The frame carries arms 15 and 16 adjacent to opposite ends thereof projecting laterally outward in the same direction. Spaced spindles 17 and 18 are supported in the arms 15 and 16 and extend longitudinally of the hopper along one side thereof, the spindle 17 having external threads as shown in Fig. 2. The spindle 18 carries a gear 19 enclosed within a housing 21 on the arm 16 and also a crank 22 which is secured to the end of the spindle by means of a nut 23, and carries a handle 24 for rotation of the spindle 18. The spindle 17 carries a gear 25 meshing with the gear 19 and enclosed within the housing 21.

A circular shroud plate 26 is attached to the end of the hopper against the arm 15 of the frame, and has an opening 27 provided with a flange 28 for the reception of the open end of the hopper 6, the opposite end of the hopper being closed. The shroud plate 26 has an annular flange 29 extending outwardly therefrom away from the hopper to enclose the cutter plate presently to be described. The lower end of the flange 29 is cut away as shown at 31 to facilitate and confine the discharge of crushed ice from the crusher into a suitable receptacle.

The spindle 17 extends beyond the arm 15 and through the shroud plate 26, the end thereof being formed as shown at 32 for the reception of the hub 33 of a cutter plate designated generally by the numeral 34, and presently to be more fully described. A shield 35 consists of a disk of sheet metal and is arranged to be received within the edge of the flange 29. The shield has a central opening for the reception of the threaded end 36 of the spindle 17, a wing nut 37 being threaded thereon to retain the hub 33 and the shield 35 firmly on the spindle. A feed plate 38 has a configuration for reception in the hopper 6 and is carried on an arm 39 slidably carried on the shaft 18 and the shaft 17. The arm carries a latch 41 which is held in a slot of the arm and is pivotally supported on the spindle 18, as shown in Fig. 2. The latch has a handle 42 for the manual manipulation thereof about the spindle 18, and has a portion 43 provided with internal threads 44 for engagement with the threads on the spindle 17. A spring pressed ball 45 serves to retain the latch in either of two rotative positions in one of which, as shown in Fig. 2, the portion 43 is in engagement with the spindle 17, and in the other of which the portion 43 is out of engagement. When the latch occupies the former position, the plate 38 will be fed forward in a hopper 6 upon rotation of the crank 22, and while the latch is in the latter position, the plate may be moved independently of the spindle to reposition the same.

Directing attention now more particularly to the cutter plate 34, we form this plate from a sheet of steel or similar hard metal suitable in composition for the formation of the cutters presently to be described. The plate is of such size as to closely fit along the inner surface of the flange 29, whereby to prevent the egress of ice particles between the cutter plate and the flange. The hub 33 may be attached thereto in any suitable manner, as, for example, by the rivets 46, the hub being arranged to abut against the shoulder 47 on the spindle 17 to determine the position of the cutter plate thereon. A plurality of openings are punched in the cutter plate 34, one of which is shown at 48 in Fig. 4. Trailing the openings in the travel of the plate are teeth such as shown at 49 which are advantageously formed by making an arcuate shear in the metal, as shown at 51, and thereafter bending upwardly the portion of metal thus sheared from the plate, as shown in Fig. 5, so that the plane of the cutter is tangential to a circle generated on the center of rotation of the plate. This causes the cutter to have a convex forward edge 52 and a concave trailing edge 53, and provides sharp points 54 on the outer ends of the cutters, the sharp ends overhanging the openings 48. Through this manner the plate is made at relatively small cost, since the only operations required thereon are the punching operations required to form the openings 48, the shearing operation required to sever the metal along the trailing edge of the cutters, and the forming operations required to bend the cutter angularly with respect to the plane of the plate.

The openings and their associated cutters are arranged on the plate, in this instance in groups of three, the groups being circumferentially spaced on the plate. Viewing Fig. 3, the numerals 55, 56 and 57 designate one group, and the numerals 58, 59 and 61 designate the group directly trailing the first mentioned group. The members of each group are spaced spirally on the surface of the plate, and the members of the various groups are staggered radially so that each cutter subscribes a different path through the ice positioned in the hopper 6 and pressed against the surface of the plate. Through this arrangement of the openings and cutters the resistance to rotation of the cutter plate is substantially uniform through its entire travel. Beginning with the opening 55 and its associated cutter, and assuming that this cutter is just entering the ice held in the hopper 6, it will be seen that after this cutter has passed a short distance into the ice, the cutter associated with the opening 56 begins to enter and after an equally spaced interval, the cutter 57 enters. Upon continued rotation of the plate, the cutter associated with the opening 56 of the next succeeding group begins to enter the ice so that at all times the number of cutters engaging the ice is substantially uniform due to the spiral arrangement of the cutters. It will also be noted that the cutter associated with the opening 58 will subscribe an arc in the ice midway between those formed by the cutters associated with the openings 56 and 57. Moving rearward to a third group of openings and associated cutters, the cutter associated with the opening 62 will subscribe an arc in the ice midway between those formed by the cutters associated with the openings 56 and 58. It will be observed that because of this staggered relationship, a gradual shaving or chipping off of the forward surface of the ice will occur as the blocks thereof carried in the chamber 6 are forced against the cutter plate by the feed plate 38.

The operation of the ice crusher will doubtless be fully understood. The feed plate 38 is placed at the end of the hopper 6 adjacent the arm 16, and the latch 41 is positioned for the portion 43 thereof to engage the spindle 17. Ice is placed in the hopper and the crank 22 rotated to rotate the cutter plate in the direction indicated by the arrow. The feed plate 38 then feeds the ice forward against that side of the cutter plate from which the cutters 49 project. The sharp points 54 of the cutters enter the ice, causing the surface thereof to chip off in the form of small chips which are directed through the openings 48 by the cutters. This is facilitated materially by the shape of the forward edge of the cutters which cause the chips as they fly off the main body of the ice to pass, in large part, directly through the openings 48. The shield 35 serves to prevent any excessive outward travel of the chips and to confine them within the flange 29, the shield and flange, directing the movement of the chips outward through the opening in the bottom of the flange. The cutter plate is caused to fit closely against the flange 29 at its periphery so as to prevent larger pieces of ice from passing between the plate and the flange, thereby tending to wedge into the space to interfere with the operation of the crusher. Likewise, the openings 48 serve somewhat as a screen to predetermine the maximum size of the chips.

While we have thus described a specific embodiment of our invention, we are aware that numerous alterations and changes may be made therein without departing from the spirit of the invention, and we do not wish to be limited except as required by the prior art and the scope of the appended claims, in which—

We claim:

1. The combination in an ice crusher, of a cutter plate having a plurality of punched openings, cutters on the plate sheared from the metal adjoining said openings and bent at an angle with respect to the plane of the cutter plate, the forward edge of said cutters comprising a portion of the periphery of said punched openings and having a convex curvature, said cutters and openings being circumferentially spaced in groups, the cutters of each group being spirally spaced and offset with respect to the cutters of the other groups, means for urging blocks of ice against the plate for engagement by the cutters, and means for rotating the cutter plate to cause the cutters to chip ice therefrom by inscribing a plurality of closely spaced paths through the ice, the position and shape of said cutters acting to direct the chips through said openings.

2. The combination in an ice crusher of a cutter plate including a plurality of circumferentially spaced groups of relatively thin cutter blades projecting substantially at right angles to the face of the plate with the sides of the blades substantially tangential to the direction of travel thereof, the blades of each group being spirally spaced and the blades of each group being offset with respect to the blades of the other groups, said plate having openings leading each of said blades of such size as to pass the ice chips cut by said blades, means for rotating the cutter plate, and means for feeding blocks of ice against the plate.

3. The combination in an ice crusher of a plate having a plurality of spaced openings and relatively thin cutter blades positioned at the trailing edges of said openings, projecting from the plate in planes tangential with respect to the direction of travel thereof, and the leading edges projecting over said openings, said openings being of such size as to pass the ice chips out by said blades.

4. The combination in an ice crusher of a plate having a plurality of spaced openings and a relatively thin cutter blade, positioned at the trailing edge of each of said openings with the sides thereof substantially tangential with respect to the direction of its travel, the blade having a convex forward edge and a concave trailing edge which edges meet at a point overhanging the opening, said openings being of such size as to pass the ice chips cut by said blades.

5. The method of making a rotary ice crusher plate which includes the steps of punching a plurality of holes in a metal plate, making an arcuate shear in the plate diverging from said holes, and thereafter outwardly bending the metal in the area between the holes and shears to form cutters substantially at right angles to the plate the planes of the cutters thus formed being tangential to circles generated on the center of rotation of the plate.

MICHAEL W. McARDLE.
IVAR JEPPSSON.